United States Patent
Paramasivam et al.

(10) Patent No.: US 8,956,750 B2
(45) Date of Patent: Feb. 17, 2015

(54) POWER SUPPLY STRUCTURE

(75) Inventors: Saravanan Paramasivam, South Lyon, MI (US); Daniel Miller, Dearborn, MI (US); Brian Utley, Canton, MI (US); Patrick Daniel Maguire, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 277 days.

(21) Appl. No.: 13/344,817

(22) Filed: Jan. 6, 2012

(65) Prior Publication Data

US 2012/0175320 A1 Jul. 12, 2012

Related U.S. Application Data

(60) Provisional application No. 61/430,263, filed on Jan. 6, 2011.

(51) Int. Cl.
*H01M 2/10* (2006.01)

(52) U.S. Cl.
CPC .......... *H01M 2/1077* (2013.01); *H01M 2/1083* (2013.01)
USPC ................................ 429/99; 429/100; 211/26

(58) Field of Classification Search
USPC ............ 211/13.1, 41.17, 41.18, 175, 189, 26, 211/26.2; 180/68.5; 429/99, 100, 120, 151; 248/503, 510, 500, 499
See application file for complete search history.

(56) References Cited

U.S. PATENT DOCUMENTS

| | | | | |
|---|---|---|---|---|
| 2,514,056 A | * | 7/1950 | Hatfield ....................... | 180/68.5 |
| 3,714,513 A | * | 1/1973 | Marconi ....................... | 361/801 |
| 3,723,823 A | * | 3/1973 | Lit et al. ....................... | 361/802 |
| 4,324,330 A | * | 4/1982 | Durney ......................... | 206/708 |
| 4,538,211 A | * | 8/1985 | Bertellotti et al. ............ | 361/797 |
| 4,544,066 A | * | 10/1985 | Koppensteiner et al. .. | 211/41.17 |
| 6,434,018 B1 | * | 8/2002 | Waltz ............................. | 361/796 |
| 6,475,659 B1 | * | 11/2002 | Heimer .......................... | 429/66 |
| 6,760,220 B2 | * | 7/2004 | Canter et al. .................. | 361/694 |
| 7,128,999 B1 | * | 10/2006 | Martin et al. .................. | 429/99 |
| 7,507,500 B2 | | 3/2009 | Donnelly et al. | |
| 7,531,270 B2 | | 5/2009 | Buck et al. | |
| 2008/0124622 A1 | | 5/2008 | Hamada et al. | |
| 2008/0160395 A1 | | 7/2008 | Okada et al. | |
| 2009/0111010 A1 | | 4/2009 | Okada et al. | |
| 2010/0289295 A1 | * | 11/2010 | Yoda et al. ............... | 296/187.03 |
| 2012/0244404 A1 | * | 9/2012 | Obasih et al. .................. | 429/99 |

\* cited by examiner

*Primary Examiner* — Korie H Chan
(74) *Attorney, Agent, or Firm* — David B. Kelley; Brooks Kushman P.C.

(57) ABSTRACT

A retaining structure for a power supply may include top and bottom rails connected by columns, which carry loads that would otherwise be applied to the power supply. End plates may be attached to the rails to inhibit movement of the cells in directions parallel to the top and bottom rails. The rails may have a cross section configured to carry at least some of the loads applied to the battery pack. For example, at least a portion of the cross section may be configured in a shape that acts as a spring and deflects upon loading.

19 Claims, 6 Drawing Sheets

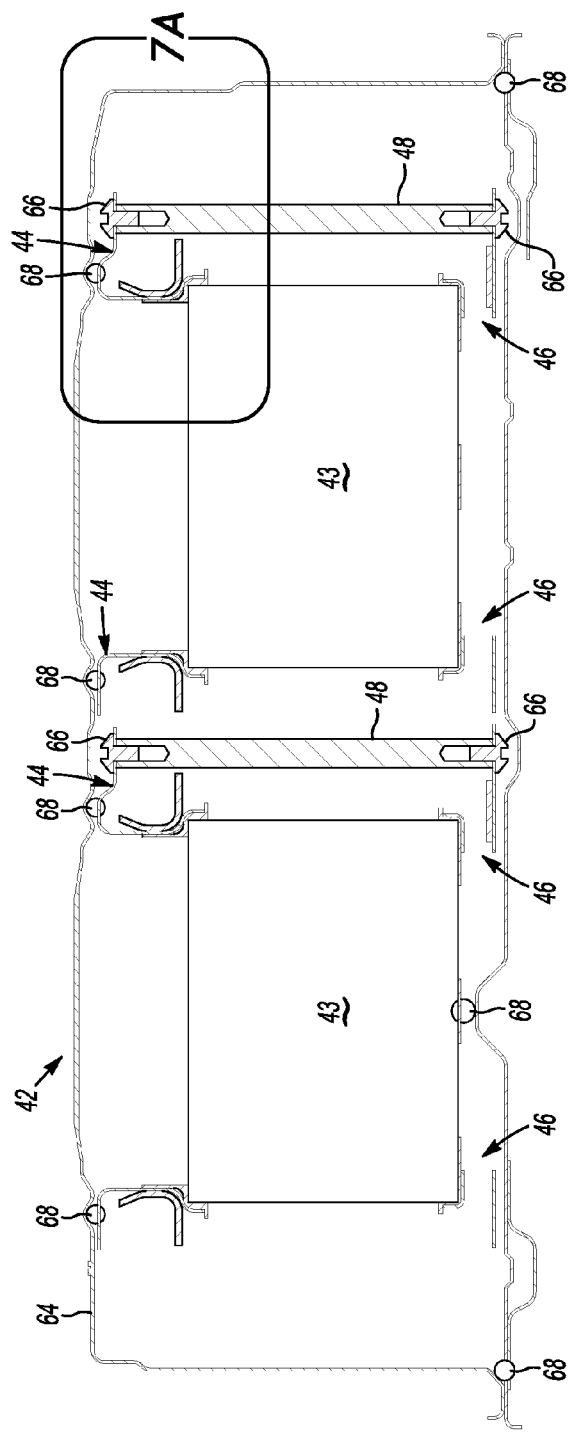
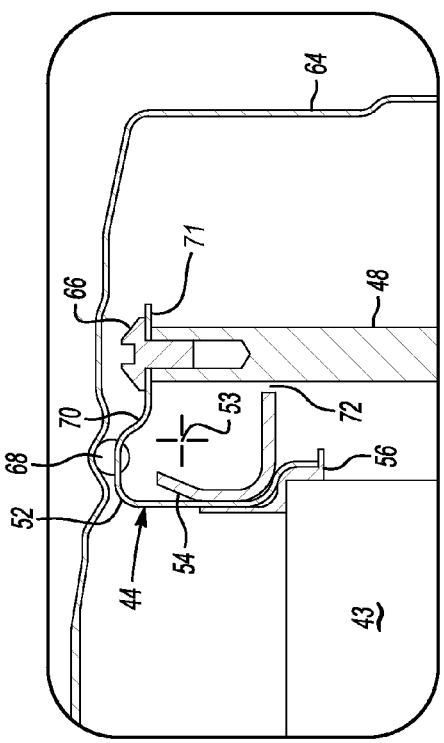
Fig-7
Fig-7A

POWER SUPPLY STRUCTURE

CROSS-REFERENCE TO RELATED APPLICATIONS

This application claims the benefit of U.S. provisional application No. 61/430,263 filed 6 Jan. 2011, which is hereby incorporated herein by reference.

TECHNICAL FIELD

The present invention relates to a retaining structure for a power supply.

BACKGROUND

Power supplies used in some applications, for example, an array of battery cells used in an electric or hybrid electric vehicle (HEV), have retention and load carrying requirements that must be met. In particular, an HEV battery pack needs to be retained in six linear directions, and at the same time is limited to a maximum load carrying capability. It is therefore desirable to have a structure that is easy to assemble and capable of transferring or carrying loads that would otherwise be felt by the battery cells.

SUMMARY

Embodiments of the invention provide a retaining structure for a power supply, such as a battery pack used in a vehicle. In at least some embodiments, top and bottom rails are connected by columns, which carry vertical loads that would otherwise be applied to the battery cells. End plates may be attached to the rails to inhibit movement of the cells in directions parallel to the top and bottom rails. The rails may have a cross section configured to carry at least some of the loads applied to the battery pack. For example, at least a portion of the cross section may be configured with a shape that acts as a spring and deflects upon loading. Embodiments of the invention provide a structure that retains individual battery cells in an array such that it acts like a stiff beam and is able to handle high loading conditions.

Embodiments of the invention include a power supply structure having a plurality of elongate members configured to be disposed proximate respective corners of a power supply. A pair of end plates are attached to the elongate members, and a plurality of columnar members are attached to opposing pairs of the elongate members and are configured to carry at least a portion of a load applied to the elongate members.

Embodiments of the invention further include a power supply structure that includes a plurality of first members configured to retain a power supply in at least four linear directions. A plurality of second members are attached to the first members and are configured to retain the power supply in at least two other directions. A plurality of columnar members are attached to opposing pairs of the first members and are configured to carry at least a portion of a load applied to the first members.

Embodiments of the invention also include a power supply structure having a plurality of rails configured to be disposed along a length of a power supply. A pair of end plates are attached to the rails, and a plurality of columnar members are attached to opposing pairs of the rails and configured to carry at least a portion of a load applied to the rails.

BRIEF DESCRIPTION OF THE DRAWINGS

FIG. 7 shows a cross-sectional end view of the retaining structure shown in FIG. 4; and FIG. 7A shows an area of detail of the retaining structure illustrated in FIG. 7.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
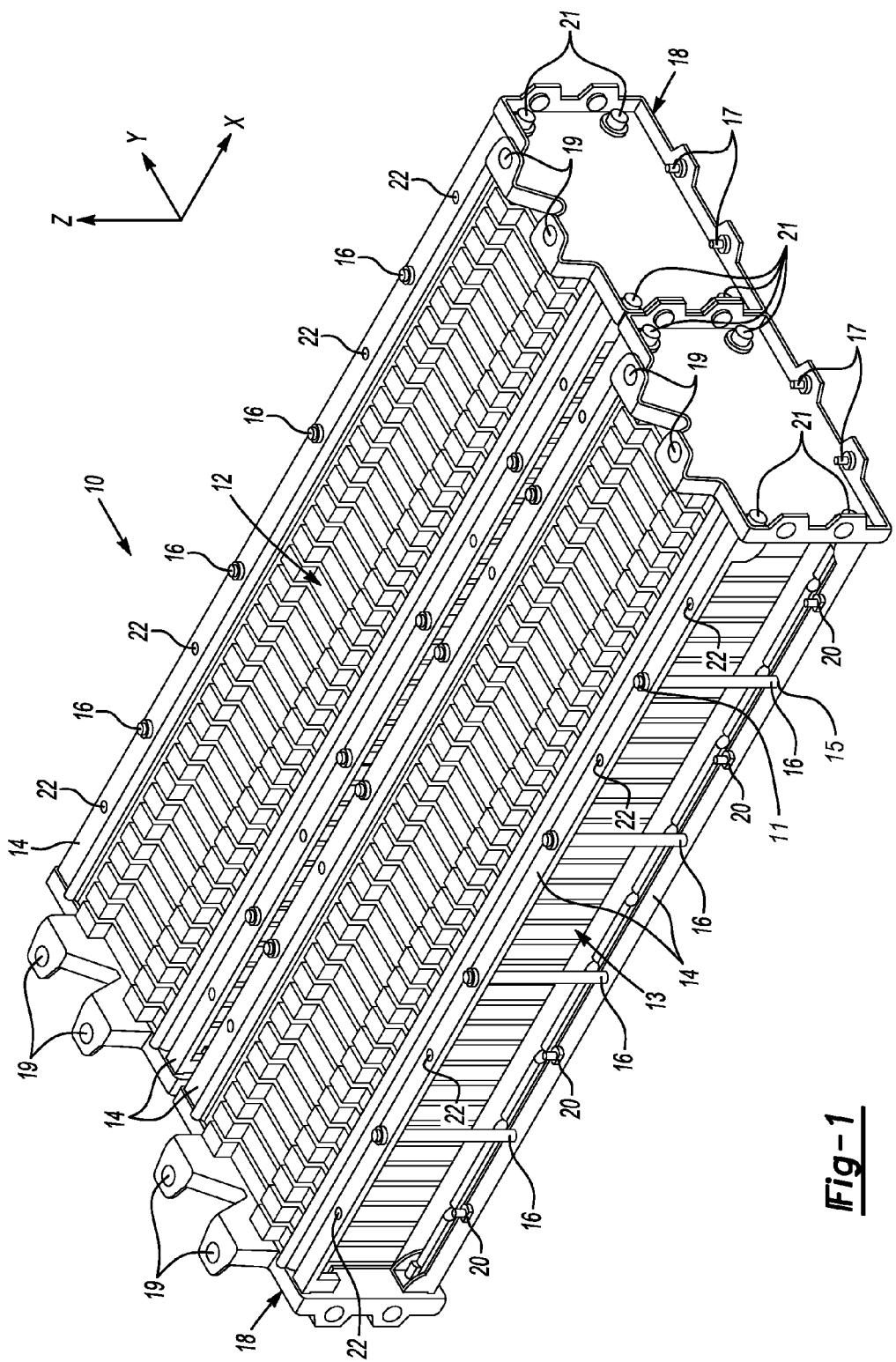
FIG. 1 shows a perspective view of a battery pack retained by a structure in accordance with an embodiment of the invention.

FIG. 1 shows a power supply retaining structure 10 in accordance with an embodiment of the present invention. The power supply structure 10 is attached to and is holding together a power supply, which in this case, is made up of two arrays of battery cells 12. The structure 10 includes first elongate members or rails 14, columnar members or columns 16, and second members or endplates 18. Although FIG. 1 shows a pair of two arrays being held together by the structure 10, retaining structures in accordance with embodiments of the present invention may retain other types of power supplies, such as fewer than two or more than two arrays of battery cells, for example, by varying the size of the endplates.

The rails 14 are disposed along a length of the arrays and hold the cells 12 on the four corners, thus retaining the battery pack in four directions, specifically, along the y- and z- axes. The endplates 18 are attached to opposite ends of the rails 14 and retain the cells 12 in the other two directions, specifically, along the x-axis. The columns 16 are attached to opposing pairs of the rails 14, proximate opposite ends 11, 15 (only two of which are labeled) of the columns 16, and carry at least some of the loads that are applied on the rails, thus facilitating a transfer of force away from the cells 12. As explained below in conjunction with FIG. 3, the rails 14 are configured—i.e., shaped and toleranced—in a way to have a spring effect and deform in the presence of a loading force to reduce the loads carried by the cells 12, and to move excess loads to the columns 16.

In the embodiment shown in FIG. 1, the rails 14 on the top and bottom of the arrays of cells 12 have the same geometric configuration; however, embodiments of the present invention may have different rails on the top and bottom. This may be warranted if a bottom side of the structure 10 is attached to a floor (not shown), and a top of the structure 10 is attached to a cover (also not shown) that has different attachment needs from the floor. Shown in FIG. 1 are fasteners 20, which traverse apertures in the bottom rail 14, and fasteners 17, which traverse apertures in the endplates 18, to facilitate attachment to a floor. Similarly, apertures 22 shown in the top rails 14, and apertures 19 shown in the endplates 18, can accommodate fasteners (not shown) to attach the structure 10 to a cover. Fasteners 21 secure the endplates 18 to the rails 14 such that the endplates 18 are in a fixed position relative to the cells 12, and the endplates 18 may apply a compressive load on the rails 14.

Figure 2A:
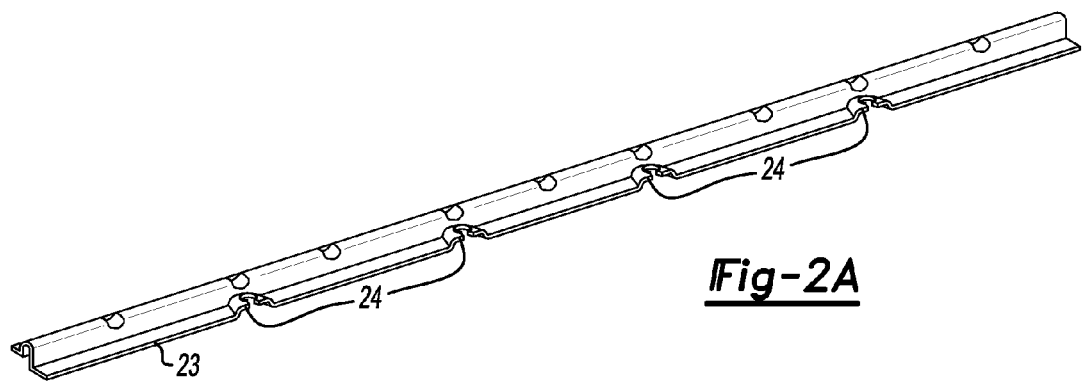
FIGS. 2A-2C show a number of components of a retaining structure in accordance with embodiments of the invention.
Figure 2B:
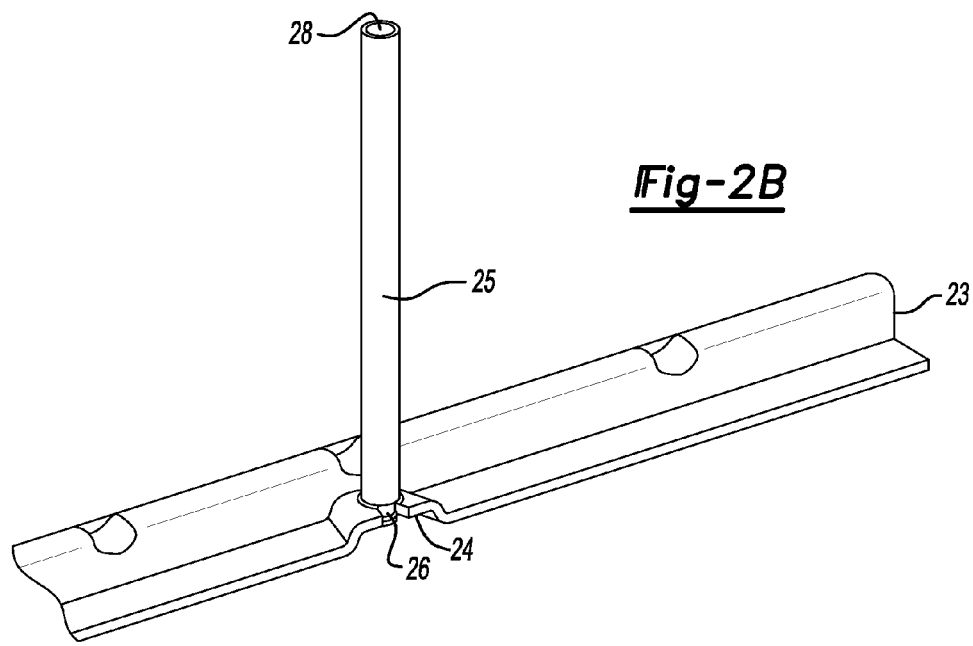
Figure 2C:
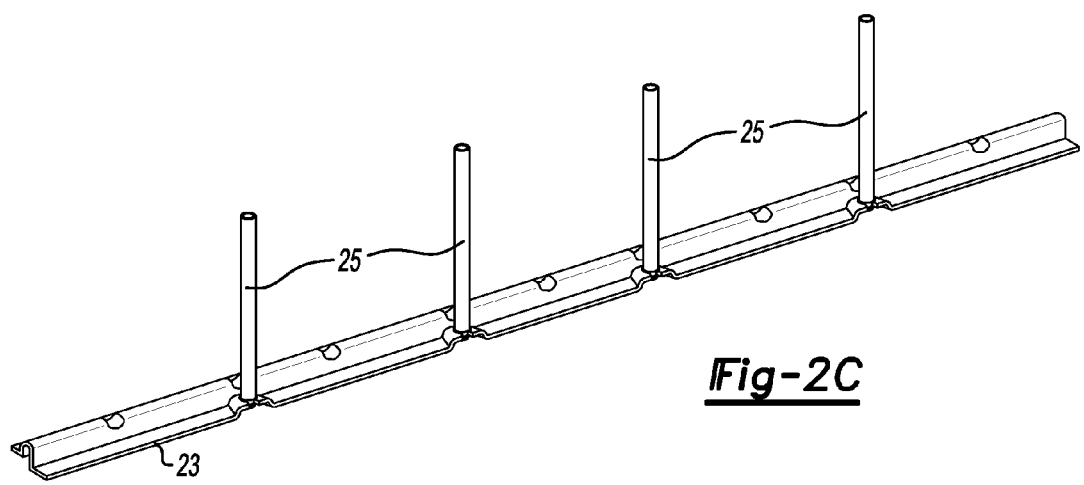

FIGS. 2A-2C show some of the elements of a structure like the structure 10 shown in FIG. 1. In FIG. 2A, a rail 23 is shown with no columns installed. This view illustrates bosses 24 that are formed in the rail 23 to accommodate columns such as a column 25—see FIG. 2B. Also shown in FIG. 2B is a slot 26 near an end of the column 25, which facilitates assembly and retention of the column 25 in the boss 24. FIG. 2B also shows the column 25 with an aperture 28 therein. The aperture 28 may be through the column 25, thereby making the column 25 a hollow tube. The aperture 28 may also be a blind hole, and in either case may be configured to receive a fastener, such as a machine screw, to facilitate attachment of the columns 25 to the rails 23, and ultimately attachment of the rails 23 and columns 25 to a battery pack, such as the batteries 12 shown in FIG. 1. In other embodiments, a column, such as the column 25, may itself be a long fastener configured to engage rails, such as the rail 23.

Figure 3:
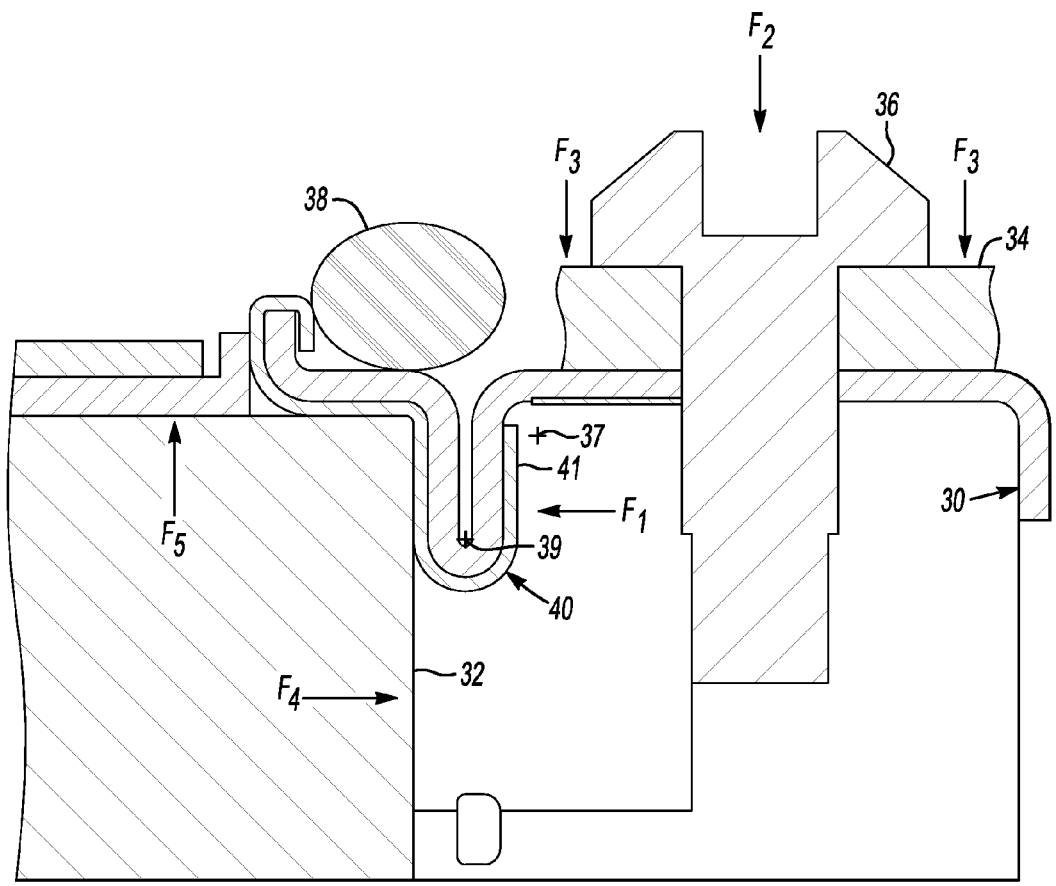
FIG. 3 shows a cross-sectional view of a portion of a battery pack with a retainer in accordance with embodiments of the invention.

FIG. 3 shows a cross section of a rail 30 retaining a battery cell 32. The rail 30 may be part of a power supply structure, such as the retaining structure 10 shown in FIG. 1. A portion of a cover 34 is shown attached to the rail 30 with a fastener 36. A seal 38 is shown on top of the rail 30, and is configured to provide a seal between the rail 30 and the cover 34. As described above in conjunction with the rail 14 of the structure 10, the rail 30 is configured to transfer loads away from battery cells, such as the cell 32. The rail 30 has a U-shaped portion 40 that will deflect in the presence of a load, such as external forces ($F_1$), ($F_2$), ($F_3$), and inertial forces ($F_4$), ($F_5$) shown in FIG. 3.

Specifically, the rail 30 deforms around at least one of the longitudinal axes 37, 39 of the rail 30. This does not necessarily mean that either axis 37, 39 is a perfect center of rotation as the rail deforms; rather, it illustrates that the rail 30 generally deforms around a longitudinal axis or axes, as opposed to along such an axis, which would be the case for a typical beam loading condition. The deflection of the U-shaped portion 40 absorbs at least some of the energy associated with the load, and reduces the force on the battery cell 32. An insulator 41 may optionally be used to isolate the battery cell 32 from the rail 30. Embodiments of the present invention may have other cross-sectional configurations specifically designed to deflect in the presence of a load, thereby isolating a battery cell or cells from the full effect of a loading condition.

Figure 4:
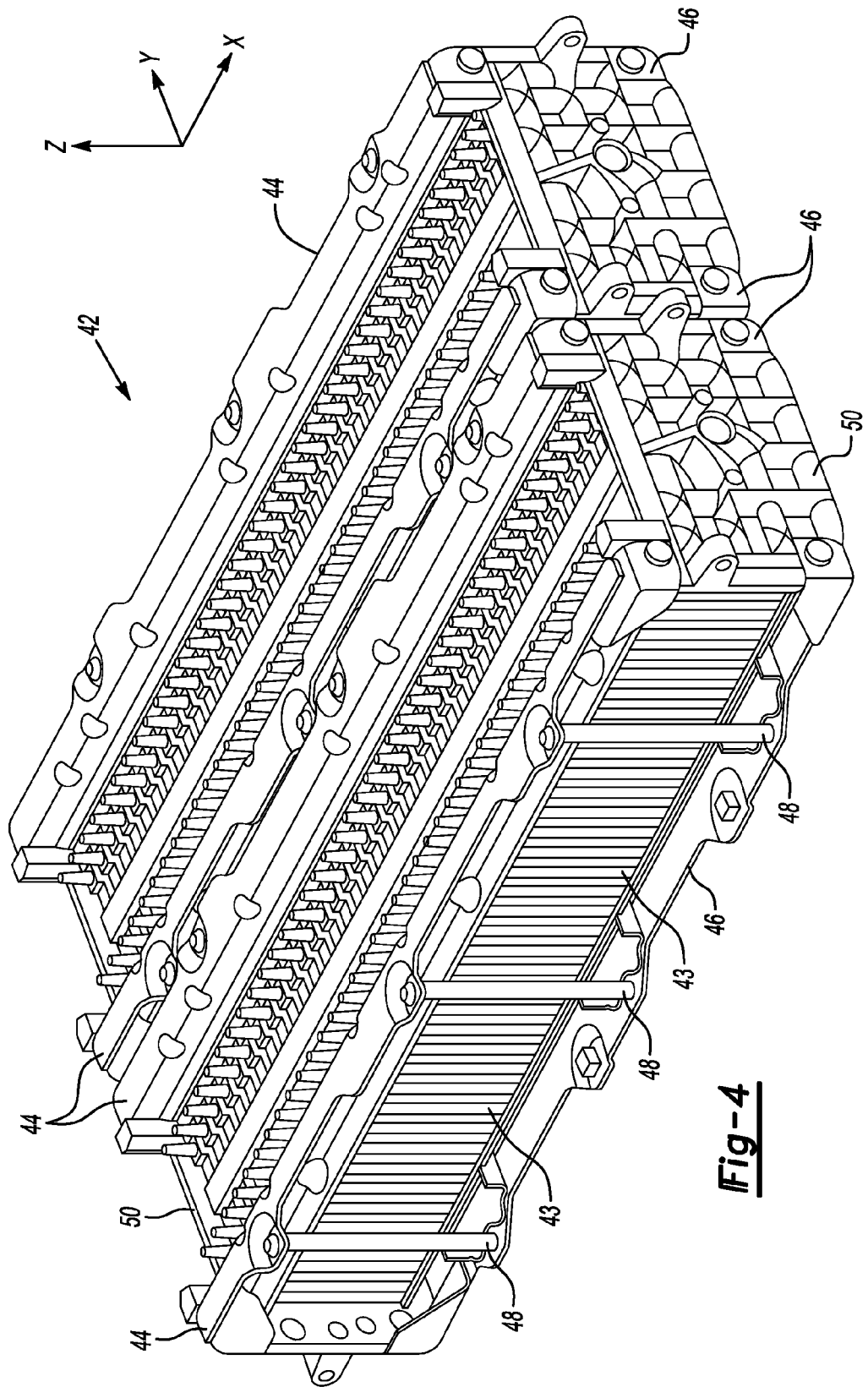
FIG. 4 shows a perspective view of a battery pack retained by a structure in accordance with an embodiment of the invention.

FIG. 4 shows a power supply retaining structure 42 in accordance with another embodiment of the present invention. The structure 42 is configured to retain a power supply having arrays of battery cells 43, only a few of which are labeled for clarity. The structure 42 includes first members, which are elongate members and consist of top rails 44 and bottom rails 46. The rails 44, 46 are disposed proximate corners of the cells 43 along a length of the arrays, and are attached to opposing ends of columnar members or columns 48. Although the term "corner" often implies a vertex of straight lines or edges, it is understood that radiused or otherwise rounded edges or surfaces may be considered "corners" for purposes of this description.

The structure 42 also contains second members or endplates 50, which attach to the top and bottom rails 44, 46. Similar to the structure 10 illustrated in FIG. 1, the structure 42 is also configured to resist dislodging of the battery cells 43 in the presence of substantial inertial loads, regardless of the direction of application of the loads. The structure 42 carries, and isolates the battery cells 43 from, at least a portion of such loads. Unlike the structure 10, where the rails 14 were the same on the top and bottom, the top and bottom rails 44, 46 of the structure 42 are configured differently from each other. This is illustrated and described in conjunction with FIGS. 5 and 6.

Figure 5:
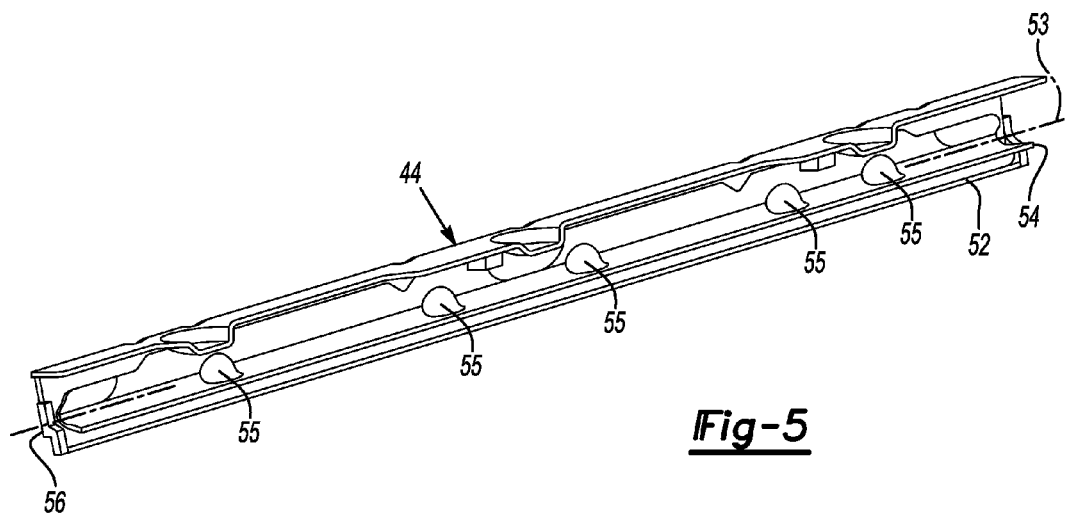
FIG. 5 shows a top rail of the retaining structure shown in FIG. 4.

FIG. 5 shows one of the top rails 44 in detail. Specifically, the top rails 44 each include an outer member 52, which may be made from, for example, stamped sheet metal. Providing additional strength to the rail 44 is an inner member 54, which may be, for example, a steel bracket welded to the outer member 52. The bracket 54, among other things, helps the rail 44 to resist deformation along its axis 53. The bracket 54 may include stamped bosses 55 to further resist deformation in the presence of a load. Also shown in FIG. 5 is an insulator 56 attached to a portion of the upper rail 44. As illustrated in more detail in FIG. 7A, the insulator 56 helps to isolate a battery cell, such as the battery cell 43, from a rail, which as described above may be made from an electrically conductive material such as sheet metal. The insulator 56 is similar to the insulator 41 illustrated in FIG. 3 in conjunction with the retaining structure 10.

Figure 6:
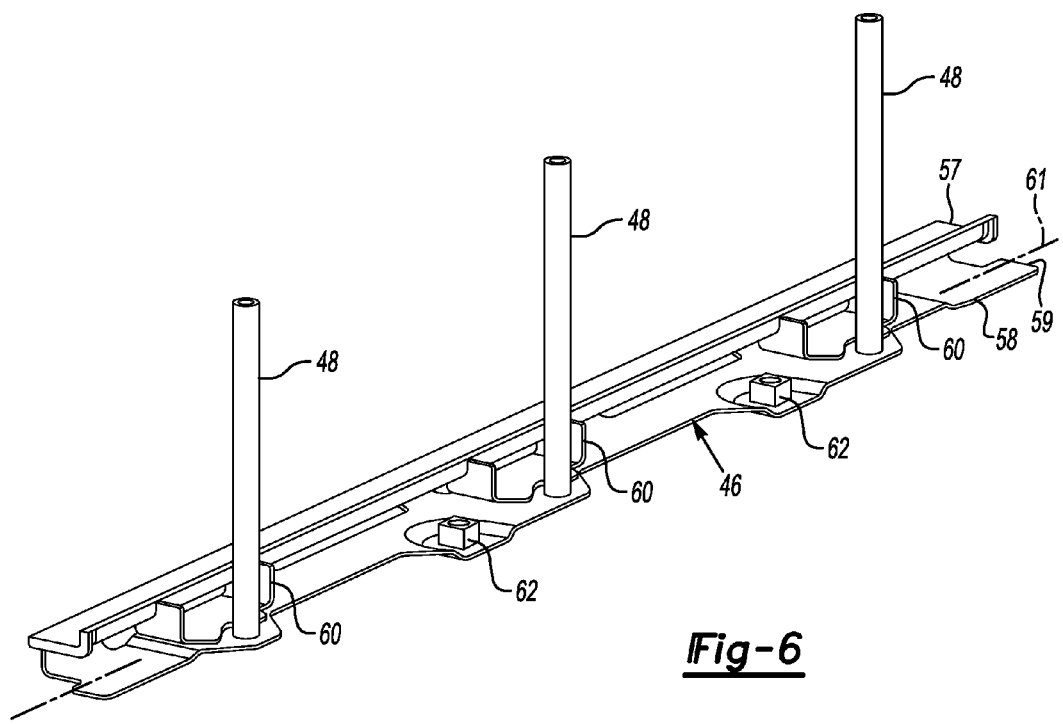
FIG. 6 shows a bottom rail of the retaining structure shown in FIG. 4.

FIG. 6 shows one of the bottom rails 46 in detail, along with support columns 48 attached thereto. The bottom rails 46 of the retaining structure 42 are also configured to provide greater strength than may be afforded by a simple metal stamping. The bottom rail 46 is made up of an outer member 58, which, like the outer member 52 of the top rail 44, may be made from stamped sheet metal. To provide additional strength, inner members, or brackets 60, are welded to the outer member 58 such that they are disposed between upper and lower portions 57, 59 of the outer member 58. Brackets, such as the brackets 60 may also be press fit between the upper and lower portions 57, 59, an adhesive may be used to hold them in place, or they may be otherwise attached by any effective means. The brackets 60 stiffen the rail 46 and help to resist deformation around a longitudinal axis 61 of the rail 46. Also shown in FIG. 6 are weld nuts 62, which are welded to the lower portion 59 of the outer member 58. The weld nuts 62 are configured to receive threaded fasteners, which may be used, for example, to attach a portion of a floor or cover around the structure 42.

FIG. 7 illustrates a cover 64 disposed around the retaining structure 42. In FIG. 7, the retaining structure 42 is shown as a cross-sectional end view. In this view, only the two right-hand columns 48 of each of the side-by-side arrays are shown. This is because the columns 48 are staggered from one side of the battery array to the other side of the battery array along its length. This allows the arrays to be packed more closely together in the side-by-side relationship because corresponding columns, such as the columns 48 do not line up directly.

Also illustrated in FIG. 7, are fasteners 66, which are used to attach the top rails 44 and the bottom rails 46 to the columns 48. As described in detail above, with regard to the columns 16 of the retaining structure 10, other forms of attachment between rails and columns are contemplated. Seals 68 are disposed between the cover 64 and the structure 42. To further illustrate features of the structure 42, an area of detail 7A is denoted in FIG. 7, and is shown enlarged in FIG. 7A.

As shown in FIG. 7A, the outer member 52 of the upper rail 44 is attached to the column 48 with the fastener 66. Disposed between the outer member 52 and the battery cell 43 is the insulator 56. This helps to electrically isolate and provide a cushion for the battery cell 43. The outer member 52 of the upper rail 44 is not configured as a 90° L-bracket, but rather, includes a step 70 on a flange portion 71 that allows the outer member 52 to act as a stiff spring to deflect in the face of a substantial inertial load applied to the structure 42. With the configuration shown in FIG. 7A, the outer member 52 can deflect in the presence of horizontal loads, vertical loads, or some combination thereof. Specifically, the outer member 52 will deform around the axis 53 under certain loading conditions.

As described in detail above, the bracket 54 adds strength to the upper rail 44 and keeps the outer member 52 from deflecting beyond a desired limit. In addition, the structure 42 is configured such that when it is assembled, there will be a slight gap 72 between the bracket 54 and the rail 48. In the presence of relatively light loads, such as may be encountered during normal driving conditions, the gap 72 will be maintained, which will help to eliminate rattle and squeak issues. In the presence of a substantial load, however, portions of the structure 42, including the outer member 52 of the top rail 44 may deflect to such an extent that contact is made between the bracket 54 and the column 48. In these situations, which may occur in the presence of high inertial loads, such as forces $(F_4)$, $(F_5)$ shown in FIG. 3, the column 48 will help to support the bracket 54 to maintain the integrity of the structure 42. The materials and geometric configuration of the rails 44 and the gap 72 can be chosen such that contact between the outer member 52 and the rail 44 will occur only in the presence of a predetermined load. Such a predetermined load may be a load of a predetermined magnitude and direction, thus allowing the structure 42 to be "tuned" for expected, and unexpected, loading conditions.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A power supply structure, comprising:
a plurality of elongate members configured to be disposed proximate respective corners of a power supply;
a pair of end plates attached to the elongate members; and
a plurality of columnar members attached to opposing pairs of the elongate members proximate respective ends of the columnar members and configured to carry at least a portion of a load applied to the elongate members, and wherein the elongate members are separated from respective sides of the columnar members in an unloaded condition, and at least one of the elongate members is configured to contact the side of at least one of the columnar members in the presence of a predetermined force applied to the at least one of the elongate members.

2. The power supply structure of claim 1, wherein at least some of the elongate members are configured to deform in the presence of a loading force.

3. The power supply structure of claim 2, wherein all of the elongate members have the same geometric configuration, thereby making any of the elongate members interchangeable with any other of the elongate members.

4. The power supply structure of claim 2, wherein some of the elongate members have a geometry that facilitates deformation around at least one respective longitudinal axis in the presence of a loading force, and others of the elongate members have a geometry that resists deformation in the presence of a loading force.

5. The power supply of claim 4, wherein each of the elongate members includes an outer member and at least one separate inner member attached to the outer member and configured to stiffen a portion of the outer member.

6. The power supply of claim 4, wherein the some of the elongate members include respective inner members configured to stiffen the respective outer members to resist deformation along a respective longitudinal axis.

7. A power supply structure, comprising:
a plurality of first members configured to retain a power supply in at least four linear directions, at least some of the first members having a flange portion extending therefrom;
a plurality of second members attached to the first members and configured to retain the power supply in at least two other directions; and
a plurality of columnar members attached to opposing pairs of the first members proximate respective ends of the columnar members and configured to carry at least a portion of a load applied to the first members, at least one end of each of the columnar members being attached to the flange portion of a respective one of the first members such that the flange portions act as springs to absorb at least a portion of a loading force, and
wherein the first members are separated from respective sides of the columnar members in an unloaded condition, and at least one of the first members is configured to contact the side of at least one of the columnar members in the presence of a predetermined force applied to the at least one of the first members.

8. The power supply structure of claim 7, wherein the first members are configured to be disposed along a length of the power supply, and the second members are attached at opposing ends of the first members.

9. The power supply structure of claim 7, wherein at least some of the first members have a geometry that facilitates deformation in the presence of a loading force.

10. The power supply structure of claim 9, wherein all of the first members have the same geometric configuration, thereby making any of the first members interchangeable with any other of the first members.

11. The power supply structure of claim 9, wherein some of the first members have a geometry that facilitates deformation around at least one respective longitudinal axis in the presence of a loading force, and others of the first members have a geometry that resists deformation in the presence of a loading force.

12. The power supply of claim 7, wherein each of the first members includes an outer member and at least one separate inner member attached to the outer member and configured to stiffen the outer member.

13. A power supply structure, comprising:
a plurality of rails configured to be disposed along a length of a power supply;
a pair of end plates attached to the rails; and
a plurality of columnar members attached to opposing pairs of the rails and configured to carry at least a portion of a load applied to the rails, and wherein the rails are separated from respective sides of the columnar members in an unloaded condition, and at least one of the rails is configured to contact the side of at least one of the columnar members in the presence of a predetermined force applied to the at least one of the rails.

14. The power supply structure of claim 13, wherein at least some of the rails are configured to deform in the presence of a loading force.

15. The power supply structure of claim 14, wherein all of the rails have the same geometric configuration, thereby making any of the rails interchangeable with any other of the rails.

16. The power supply structure of claim 14, wherein some of the rails have a geometry that facilitates deformation around at least one respective longitudinal axis in the presence of a loading force, and others of the rails have a geometry that resists deformation in the presence of a loading force.

17. The power supply of claim 16, wherein each of the rails includes an outer member and at least one separate inner member attached to the outer member and configured to stiffen a portion of the outer member.

18. The power supply structure of claim 7, wherein the columnar members are oriented generally perpendicularly to the flange portions of the first members.

19. The power supply structure of claim 7, wherein the flange portions of the first members each include a respective step, thereby facilitating deformation of the flange portions around a longitudinal axis of a respective first member in the presence of a loading force.

\* \* \* \* \*